United States Patent
Pitman

[11] Patent Number: 5,971,492
[45] Date of Patent: Oct. 26, 1999

[54] CHILD SAFETY RESTRAINT SYSTEM FOR CAR SEAT AND METHOD OF USING THE SAME

[76] Inventor: Elizabeth Pitman, 8640 SW. McDonald, Tigard, Oreg. 97224

[21] Appl. No.: 09/173,843

[22] Filed: Oct. 16, 1998

[51] Int. Cl.[6] .................................................. B60R 22/10
[52] U.S. Cl. ........................... 297/484; 297/467; 297/485
[58] Field of Search ..................................... 297/484, 485, 297/467

[56] References Cited

U.S. PATENT DOCUMENTS

| | | | |
|---|---|---|---|
| 3,052,432 | 9/1962 | Martin | ..................... 297/467 |
| 3,325,213 | 6/1967 | Levy . | |
| 3,454,304 | 7/1969 | Hudak . | |
| 3,791,694 | 2/1974 | Roberts et al. | ............... 297/467 |
| 3,834,758 | 9/1974 | Soule . | |
| 4,033,622 | 7/1977 | Boudreau . | |
| 4,186,962 | 2/1980 | Meeker . | |
| 4,205,670 | 6/1980 | Owens | ................ 297/485 X |
| 4,540,218 | 9/1985 | Thomas . | |
| 4,874,203 | 10/1989 | Henley | ................ 297/464 X |
| 4,981,306 | 1/1991 | Young . | |
| 5,056,869 | 10/1991 | Morrison | ............... 297/467 X |
| 5,580,126 | 12/1996 | Sedlack . | |
| 5,624,135 | 4/1997 | Symonds | ............... 297/484 X |
| 5,713,630 | 2/1998 | Kvalvik . | |

*Primary Examiner*—Peter R. Brown
*Attorney, Agent, or Firm*—Marger Johnson & McCollom, P.C.

[57] ABSTRACT

A child safety restraint system is provided for a car seat, and a method of using the same. The restraint system comprises a left and a right shoulder straps that are coupled with the seat, and pass over the left and right sides of the child. The shoulder straps are complete loops that are wrapped around the back cushion of the car seat. A crotch strap is coupled with the seat and passes between the thighs of the child. The crotch strap terminates in a loop passing through the car seat belt that is fastened to itself. A left and a right buckle are slidably coupled with the shoulder straps. A crotch buckle is coupled with the crotch strap, and is fastened together with the left and right buckles. The shoulder straps are passed over the sides of the child, the crotch strap is pulled up between the thighs, and the crotch buckle is fastened together with the left and right buckles.

7 Claims, 2 Drawing Sheets

CHILD SAFETY RESTRAINT SYSTEM FOR CAR SEAT AND METHOD OF USING THE SAME

BACKGROUND OF THE INVENTION

1. Field of the Invention

The present invention is related to the field of safety restraint systems for automobile seats, and specifically to a restraint system for a child and a method of using the same.

2. Description of the Related Art

Safety restraint systems are used in automobiles for the safety of the passengers in the event of a collision. A prior art safety system is now described referring to FIGS. 1 and 2.

A car seat 10 comprises a bottom cushion 12 and a back cushion 14. The back cushion defines a top edge 18, a bottom edge 20, a right side 22 and a left side 24. The bottom cushion and the back cushion define between them a space 26.

The safety system of car seat 10 is a seat belt 30, which has a buckle 32. The seat belt is inadequate for use by children, because it is not refined enough. It provides only one line of contact with their bodies, which is not enough. Children's bodies are not strong enough to brace against a single line of contact.

One solution provided for very small children is a car child seat, such as is described in U.S. Pat. No. 4,033,622, the teachings of which are hereby incorporated in the present document by reference. The child car seat is attached to the car seat by attaching it to the seat belt, which is fastened to itself.

Neither a seat belt, however, nor a child cat seat address the safety concerns of a child that is too tall for a car seat, yet still not well developed enough to the point where the seat belt is adequate.

BRIEF SUMMARY OF THE INVENTION

The present invention overcomes these problems and limitations of the prior art.

Generally, the present invention provides a child safety restraint system for a car seat, and a method of using the same. The restraint system comprises a left and a right it shoulder straps that are coupled with the car seat, and pass over the left and right sides of the child.

Preferably the shoulder straps are complete loops that are wrapped around the back cushion of the car seat. They are joined together behind the seat by a horizontal strap.

A crotch strap is coupled with the seat and passes between the thighs of the child. Preferably the crotch strap terminates in a loop passing through the car seat belt that is fastened to itself.

A left and a right buckle are slidably coupled with the shoulder straps. A crotch buckle is coupled with the crotch strap, and is fastened together with the left and right buckles.

A method according to the invention comprises the steps of passing the left shoulder strap over the left side of the child, passing the right shoulder strap over the right side of the child, pulling the crotch strap up between the thighs of the child, and fastening the crotch buckle with the left and right buckles.

A particularly advantageous feature of this invention is the low cost of the system. This and other features and advantages of the present invention will become apparent and more appreciated after consideration of the Drawing(s) and Detailed Description of the Preferred Embodiment(s) of the invention.

DETAILED DESCRIPTION OF THE PREFERRED EMBODIMENT(S) OF THE INVENTION

Figure 1:
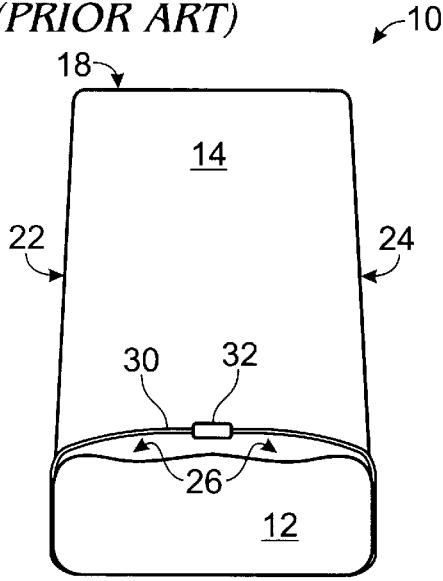
FIG. 1 is a front view of a car seat in the prior art.
Figure 2:
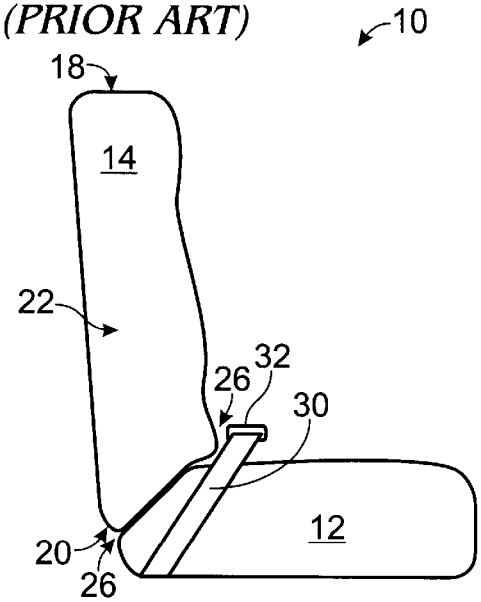
FIG. 2 is a side view of the car seat of FIG. 1.

As has been mentioned, the present invention provides a child safety restraint system. The preferred embodiment is now described with reference to FIGS. 3 and 4.

A child 8 is shown sitting in a car seat 10, by sitting on bottom cushion 12, and leaning against back cushion 14. The child is too tall to fit in an ordinary car child seat, but too short for benefitting from regular seat belt 30.

The restraint system comprises a left shoulder strap 40 and a right shoulder strap 42 fitted onto the car seat. Both straps are draped over top edge 18 of the back cushion. The left shoulder strap is closer to the left side of the back cushion, and passes over the left side of the child. The right shoulder strap is closer to the right side of the back cushion, and passes over the right side of the child.

The shoulder straps are coupled with the seat, which can be in a number of ways. For example, they can be attached to seat belt 30. This is accomplished by the straps including loops at the bottom end, through which the seat belt is passed before being fastened to itself, preferably at the tightest possible setting.

Figure 4:
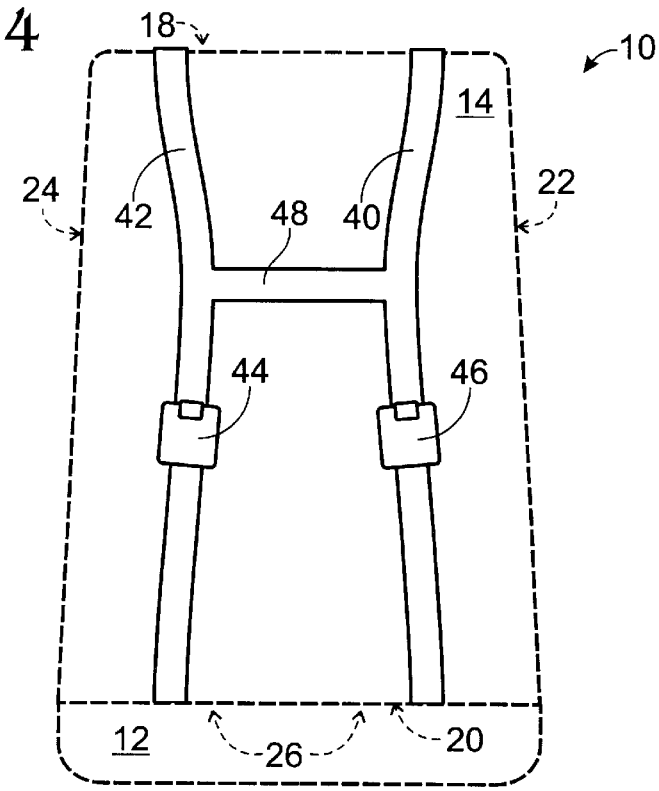
FIG. 4 is a rear view of the system of FIG. 3.

Preferably, and as also can be seen briefly in FIG. 4, the right and left shoulder straps are loops themselves. The loops wrap around the back cushion, and thus also around bottom edge 20 of the back cushion. The shoulder straps thus pass through space 26.

Sometimes space 26 is too narrow to allow the buckles of the loops to pass through it. For that case, the loops can be provided in interrupted form and reconnected with releasable buckles 44 and 46 in the back. The tongue of the buckle is thin enough to pass through space 26.

Preferably the shoulder straps are joined together, so that the restraint system can be provided in fewer separate pieces. Joining can be behind the seat, such as by a horizontal strap 48.

Returning to FIG. 3, the restraint system further comprises a right buckle 50 slidably coupled with the right shoulder strap, and a left buckle 52 slidably coupled with the left shoulder strap. These buckles are also known as respectively left buckle means and right buckle means. The right buckle terminates in a right tongue 54, and the left buckle terminates in a left tongue 56.

The restraint system further comprises a crotch strap 60. Strap 60 terminates in two ends. At one end there is a center buckle 62, also known as crotch buckle means.

The other end is coupled to the seat, which can be in a number of ways. For example, it can be joined with at least one of the shoulder straps from the back, e.g. by being attached to strap 48. Preferably the other end includes a loop 64, through which the car seat belt is passed, and then fastened to itself.

Preferably the tongues of the right and left buckles of the invention resemble "half buckles", that are fastened together with the center buckle by being inserted into it. They can be made as buckles are made for restraint systems for children's car seats.

Preferably all straps are of adjustable length, to optimize the attachment to the car seat. The straps and buckles can be made from the same materials as a car seat belt.

Figure 5:
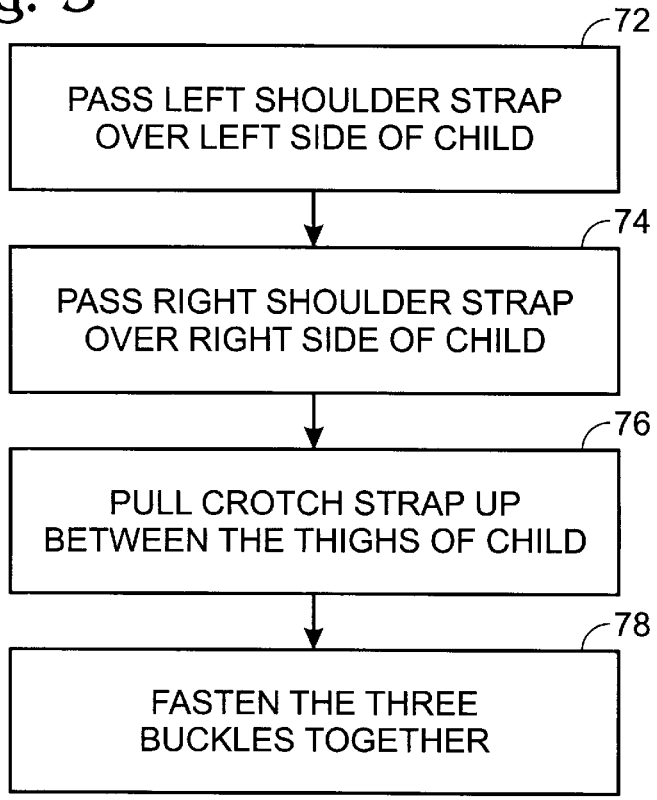
FIG. 5 is a flowchart illustrating a method of the invention.
Figure 3:
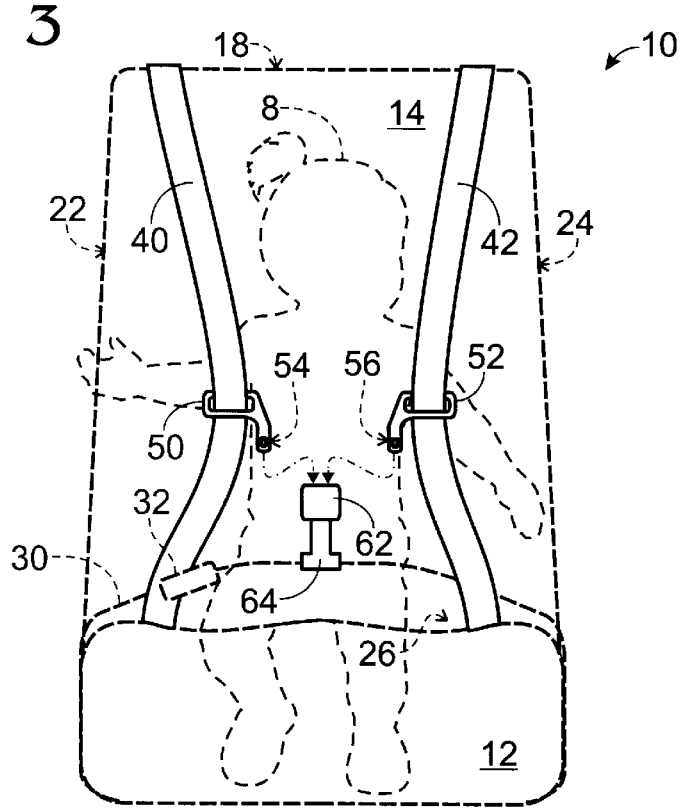
FIG. 3 illustrates a child safety restraint system made according to the present invention and used in connection with the car seat of FIG. 1.

A method according to the present invention for using the system of the invention is now described with reference to FIG. 5, for a securing to a car seat a child sitting in the car seat as seen in FIG. 3.

According to step 72, the left shoulder strap is passed over the left side of the child.

According to step 74, the right shoulder strap is passed over the right side of the child.

According to step 76, the crotch strap is pulled up between the thighs of the child.

According to step 78, the three buckles are fastened together in front of the child's chest. In the particular embodiment of FIG. 3, the crotch buckle means is fastened with the left buckle means and the right buckle means.

A person skilled in the art will be able to practice the present invention in view of the present description. In the present description numerous details have been set forth in order to provide a more thorough understanding of the present invention. It will be obvious, however, to one skilled in the art that the present invention may be practiced without these specific details. In other instances, well known features have not been described in detail in order to not obscure unnecessarily the present invention. Again, one skilled in the art will appreciate that it is possible to make various modifications, additions and substitutions to the present description without departing from the scope and spirit of the invention as claimed in the accompanying claims.

The invention claimed is:

1. A child safety restraint system which is connected to a seat of an automobile, the seat comprising a bottom cushion and a back cushion that defines a top edge, the bottom cushion and the back cushion defining a space between them, the child safety restraint system for securing to the seat a child sitting on the bottom cushion and leaning against the back cushion, the restraint system comprising:

a left shoulder strap coupled with the seat, extending around the backrest to releasably connect thereto, and draped over the top edge of the back cushion for passing over the left side of the child;

a left buckle means coupled with the left shoulder strap;

a right shoulder strap coupled with the seat, extending around the backrest to releasably connect thereto, and draped over the top edge of the back cushion for passing over the right side of the child;

a right buckle means coupled with the right shoulder strap;

a crotch strap coupled with the seat for passing between the thighs of the child; and a crotch buckle means coupled with the crotch strap and fastened with the left buckle means and the right buckle means, wherein the shoulder straps pass through the space.

2. The child safety restraint system of claim 1, wherein the shoulder straps are complete loops wrapped around the back cushion.

3. The child safety restraint system of claim 2, wherein the shoulder straps are provided in interrupted form and connected with buckles.

4. The child safety restraint system of claim 2, wherein the shoulder straps are joined together behind the seat.

5. The child safety restraint system of claim 4, wherein the shoulder straps are joined together by a horizontal strap.

6. A child safety restraint system which is connected to a seat of an automobile, the seat comprising a bottom cushion and a back cushion that defines a top edge, the seat further comprising a seat belt fastened to itself, the child safety restraint system for securing to the seat a child sitting on the bottom cushion and leaning against the back cushion, the restraint system comprising:

a left shoulder strap coupled with the seat, extending around the backrest to releasably connect thereto, and draped over the top edge of the back cushion for passing over the left side of the child;

a left buckle means coupled with the left shoulder strap;

a right shoulder strap coupled with the seat, extending around the backrest to releasably connect thereto, and draped over the top edge of the back cushion for passing over the right side of the child;

a right buckle means coupled with the right shoulder strap;

a crotch strap coupled with the seat for passing between the thighs of the child; and a crotch buckle means coupled with the crotch strap and fastened with the left buckle means and the right buckle means, wherein the shoulder straps terminate in respective loops through which the seat belt passes.

7. A child safety restraint system which is connected to a seat of an automobile, the seat comprising a bottom cushion and a back cushion that defines a top edge, the seat further comprising a seat belt fastened to itself, the child safety restraint system for securing to the seat a child sitting on the bottom cushion and leaning against the back cushion, the restraint system comprising:

a left shoulder strap coupled with the seat, extending around the backrest to releasably connect thereto, and draped over the top edge of the back cushion for passing over the left side of the child;

a left buckle means coupled with the left shoulder strap;

a right shoulder strap coupled with the seat, extending around the backrest to releasably connect thereto, and draped over the top edge of the back cushion for passing over the right side of the child;

a right buckle means coupled with the right shoulder strap;

a crotch strap coupled with the seat for passing between the thighs of the child; and a crotch buckle means coupled with the crotch strap and fastened with the left buckle means and the right buckle means wherein the crotch strap terminates in a loop passing through the seat belt.

\* \* \* \* \*